United States Patent
Babej et al.

(10) Patent No.: US 8,221,040 B2
(45) Date of Patent: Jul. 17, 2012

(54) COMPONENT ASSEMBLY CONSISTING OF A FASTENER ELEMENT AND A SHEET METAL PART AND ALSO A METHOD FOR MANUFACTURING SUCH A COMPONENT ASSEMBLY

(75) Inventors: Jiri Babej, Lich (DE); Richard Humpert, Bad Nauheim (DE); Christian Sowa, Offenbach (DE); Michael Vieth, Bad Vilbel (DE)

(73) Assignee: PROFIL-Verbindungstechnik GmbH & Co. KG (DE)

( * ) Notice: Subject to any disclaimer, the term of this patent is extended or adjusted under 35 U.S.C. 154(b) by 362 days.

(21) Appl. No.: 12/581,800

(22) Filed: Oct. 19, 2009

(65) Prior Publication Data
US 2010/0129173 A1    May 27, 2010

(30) Foreign Application Priority Data
Oct. 20, 2008   (DE) .................... 10 2008 052 383

(51) Int. Cl.
*F16B 37/04* (2006.01)
(52) U.S. Cl. ........................ 411/183; 411/187
(58) Field of Classification Search ............ 411/183, 411/184, 187
See application file for complete search history.

(56) References Cited

U.S. PATENT DOCUMENTS

| | | | | |
|---|---|---|---|---|
| 2,415,695 A * | 2/1947 | Cann | | 411/180 |
| 3,535,678 A * | 10/1970 | Gulistan | | 439/877 |
| 4,186,787 A * | 2/1980 | Husain | | 411/183 |
| 5,251,370 A * | 10/1993 | Muller et al. | | 29/512 |
| 5,267,832 A * | 12/1993 | Johnson et al. | | 415/115 |
| 5,445,483 A * | 8/1995 | Fultz | | 411/181 |
| 5,528,812 A * | 6/1996 | Muller | | 29/432.2 |
| 5,564,873 A * | 10/1996 | Ladouceur et al. | | 411/180 |
| 6,318,940 B1 * | 11/2001 | Mitts | | 411/188 |
| 6,543,855 B2 * | 4/2003 | Bruck | | 297/440.21 |
| 7,124,492 B2 * | 10/2006 | Wojciechowski et al. | | 29/515 |
| 7,393,169 B2 * | 7/2008 | Subenbach | | 411/38 |

FOREIGN PATENT DOCUMENTS
GB           1 474 766         5/1977

* cited by examiner

*Primary Examiner* — Gary Estremsky
(74) *Attorney, Agent, or Firm* — Hershkovitz & Associates, LLC

(57) ABSTRACT

A component assembly comprising a sheet metal part and a fastener element which has a flange part of larger diameter and a shaft part of smaller diameter which extends away from the flange part and merges at its end remote from the flange part into a cylindrical rivet section is characterized in that the fastener element is designed for use with sheet metal parts with thicknesses in the range of 3 mm and larger. With relatively thin sheet metal parts the sheet metal part has a smooth pierced cylindrical opening which has a diameter corresponding to the diameter of the shaft part, with the cylindrical rivet section being reshaped to a rivet bead which contacts the underside of the sheet metal part. With sheet metal parts of medium thickness the sheet metal part has a stepped hole with the hole region of larger diameter receiving the rivet bead. For relatively thick sheet metal parts the sheet metal part has a conical pierced hole and the cylindrical rivet section is reshaped to a conical rivet bead which is wedged in the conically diverging hole.

10 Claims, 7 Drawing Sheets

Figure 1A:
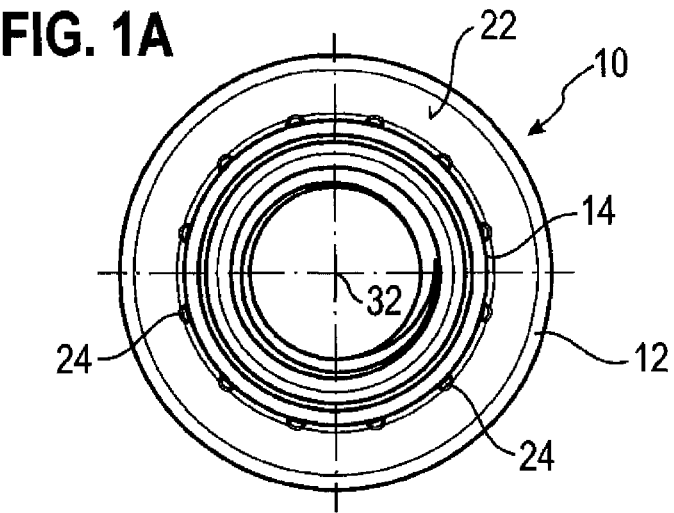

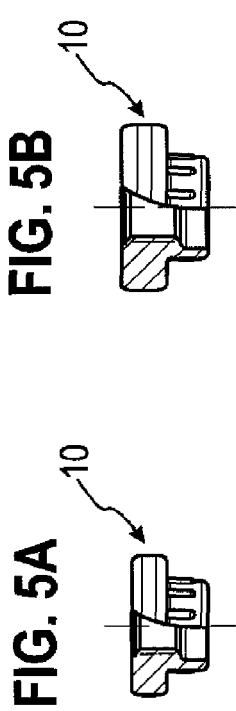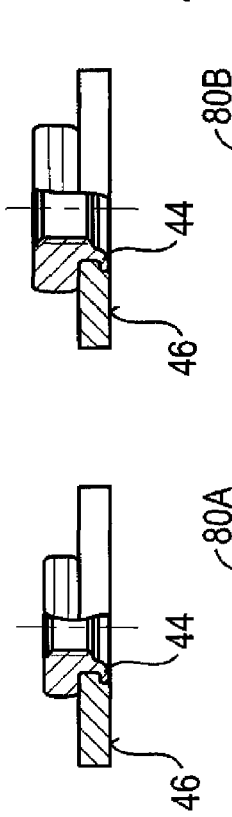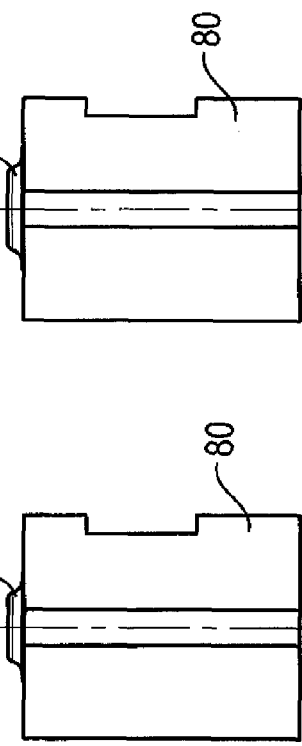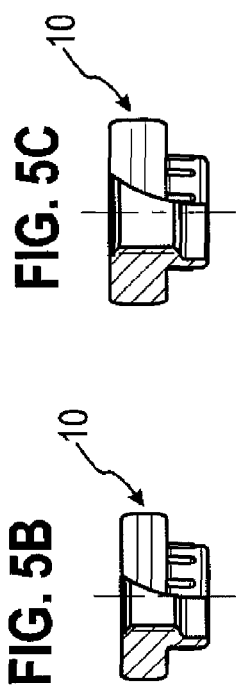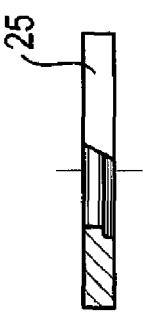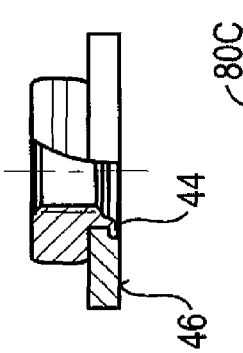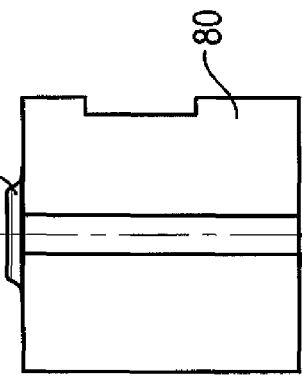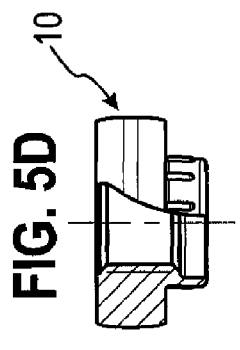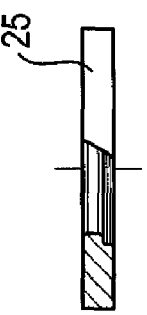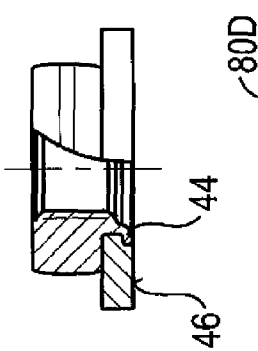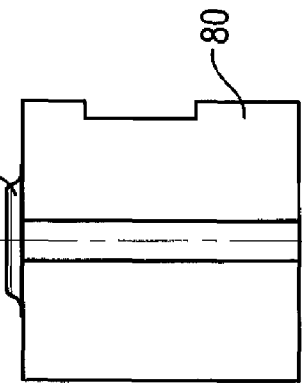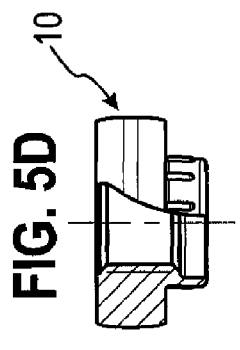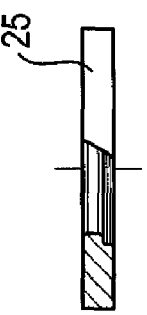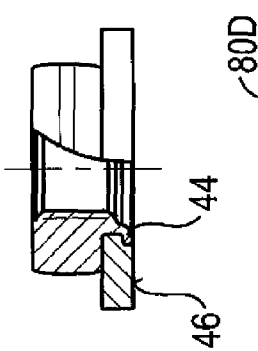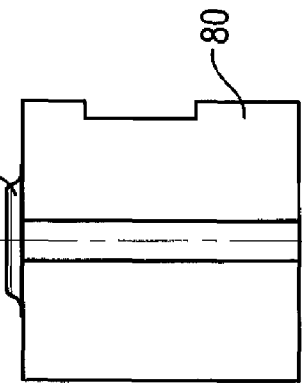

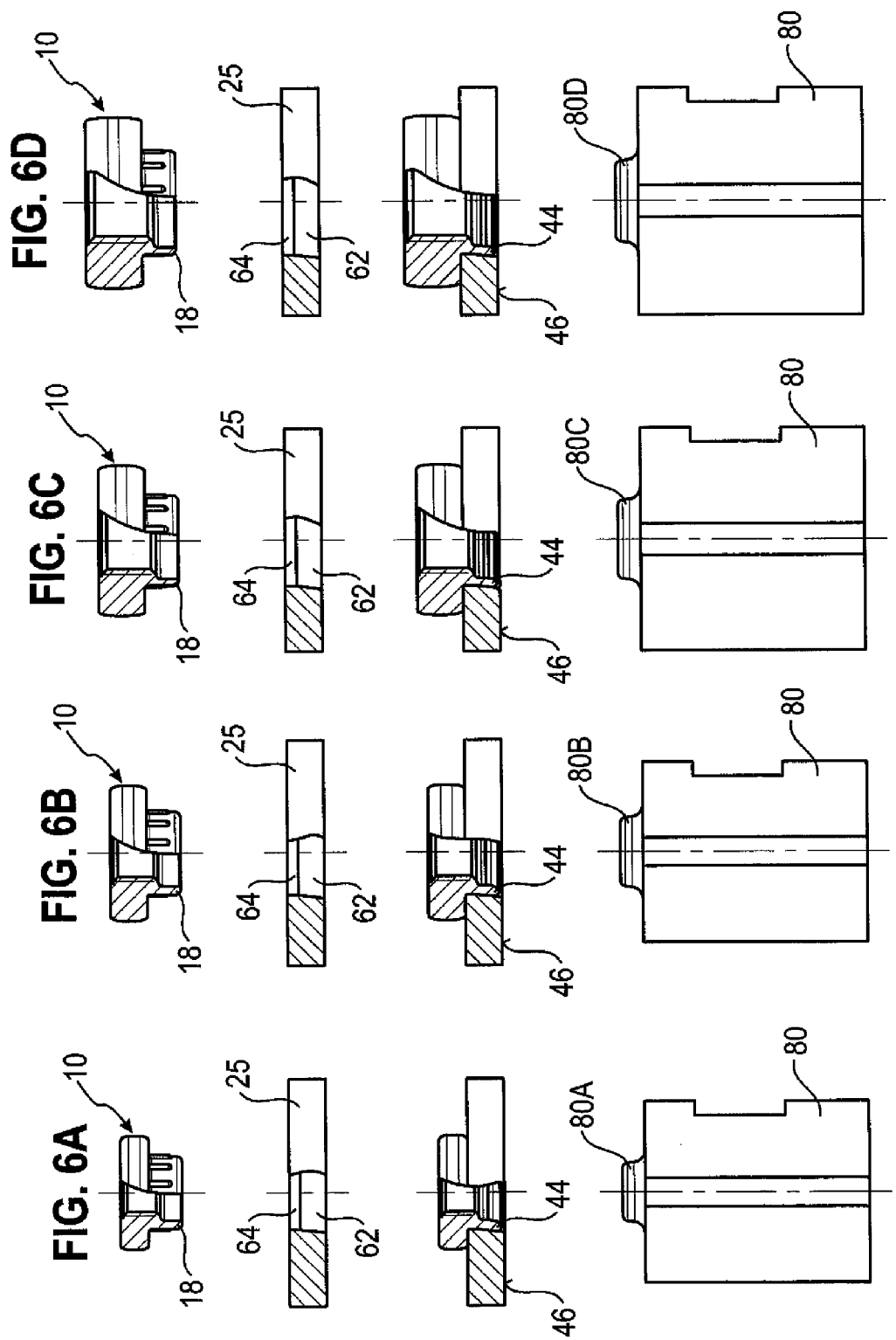

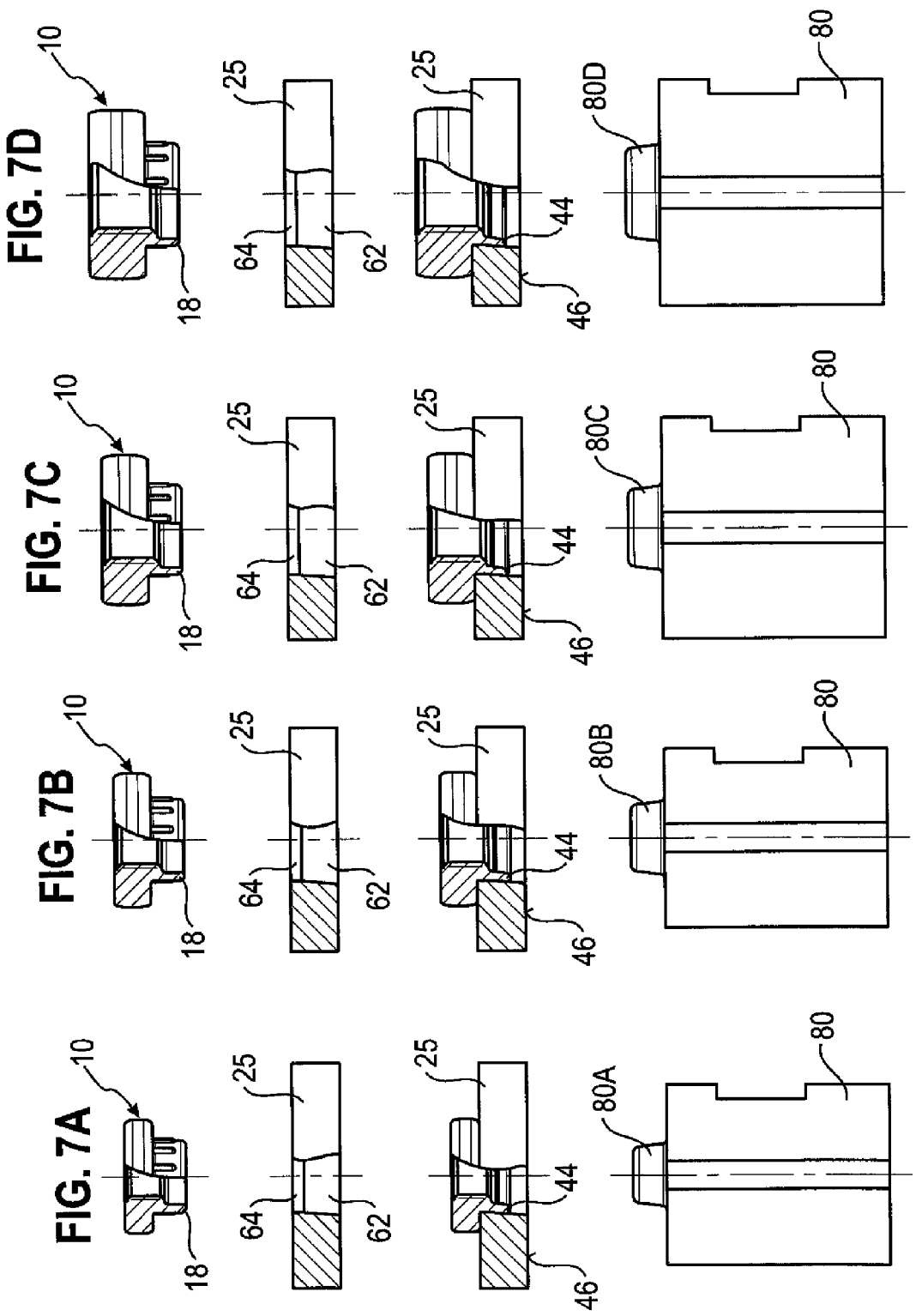

COMPONENT ASSEMBLY CONSISTING OF A FASTENER ELEMENT AND A SHEET METAL PART AND ALSO A METHOD FOR MANUFACTURING SUCH A COMPONENT ASSEMBLY

The present invention relates to a component assembly consisting of a fastener element and a sheet metal part as well as a method for the manufacture of such a component assembly. It is everyday practice in the manufacture of motorcar bodies to operate with fastener elements which are present in the form of rivet elements, piercing and riveting elements or press-in elements.

With a rivet element, the element is inserted into a pre-pierced sheet metal part and riveted to the sheet metal part by beading over the rivet section of the fastener element. The fastener element itself has a fastener part, i.e. either an internal thread or a bolt shaft with an external thread, whereby a further component can be secured to the sheet metal part using a bolt or a nut respectively. Piercing and riveting elements are made self-piercing, i.e. the element itself cuts the hole in the sheet metal part and is subsequently riveted to the sheet metal part. With press-in elements the sheet metal part is again also pre-pierced and the element is then passed through the hole and pressed together with the sheet metal part so that sheet metal material flows into undercuts of the pressing element and locks the pressing element relative to the sheet metal part, so that it is firmly secured to the sheet metal part and cannot be straightforwardly pressed out of the sheet metal part.

Such fastener elements have, in the construction of motorcars, largely displaced welding elements which were previously welded to sheet metal body parts or the like. The welding on of elements is, on the one hand, difficult to integrate into the manufacture of individual components by mechanical deformation and also leads to an undesired contamination of the sheet metal part. Further, welding elements cannot be used with various sheet metal parts, for example when these are pre-painted or consist of two sheet metal layers, optionally with a plastic membrane disposed between them. They can also not be used when the sheet metal part is a high strength part, since the heat which is associating with the welding operation leads to an unacceptable reduction of the sheet metal properties in the region of the weld location. In the manufacture of sheet metal parts for motorcars large numbers of parts are required and the sheet metal thicknesses in question normally lie in the range from 0.6 mm to 2.5 mm sometimes beyond this to 3 mm or slightly more.

A fastener element in the form of a nut element is known from U.S. Pat. No. 5,251,370 which has a flange part of larger diameter and a shaft part of smaller diameter which extends away from the flange part and merges at its end remote from the flange part into a cylindrical rivet section the outer side of which lies approximately flush with the outer side of the shaft part, i.e. has the same diameter, with the side of the flange part adjacent the shaft part forming a sheet metal contact shoulder and with features providing security against rotation being provided at the shaft part and/or in the region of the sheet metal contact shoulder.

A fastener element of this kind is attached to the sheet metal part in accordance with the named US patent by means of the so-called clamping hole riveting process. For this purpose, the sheet metal part is pre-pierced and the region around the piercing is shaped into a conical projection or into a conical collar. During the passing of the rivet section of the element through the sheet metal part, which takes place from the side of the conical projection, the rivet section is beaded over and dilated and simultaneously the conical projection is at least partly reversed, whereby the hole of the conical projection is reduced in diameter. A type of strangle-hold takes place between the sheet metal part and the fastener element and serves for excellent mechanical properties of the connection between the fastener element and the sheet metal part. The conical projection of the sheet metal parts is made differently for different sheet metal thicknesses so that one can cover different sheet metal thicknesses with one element.

In the patent specification it is brought out that the element can be used with sheet metal thicknesses up to 4 mm and, as stated above, sheet metal thicknesses of greater than 3 mm are relatively rare in motorcar construction.

Rivet elements are also used in the manufacture of trucks, however on a much smaller scale. Essentially only the use of rivet elements from motorcar manufacture is known, which are also used in thin sheet metal parts of trucks, for example in the region of the driver's cabin. More stable sheet metal parts of trucks, i.e. with the sheet metal thicknesses greater than 3 mm and normally greater than 4 mm and larger are—if at all—only provided with rivet elements in the most rare cases, since the rivet elements that are available are not designed for such thick sheet metal parts. Furthermore, far fewer trucks are manufactured in comparison to motorcars. The methods used in truck manufacture lead to welding elements dominating there.

The object of the present invention is to propose a component assembly consisting of a rivet element and a sheet metal part, and also a method for manufacturing such a component assembly, which represents a cost-favourable solution even with low quantities and which can be used economically.

In order to satisfy this object, a component assembly of the initially named kind is proposed in accordance with the invention, which is characterized in that the fastener element is designed for use with sheet metal parts having thicknesses in the range of 3 mm and larger and in that the sheet metal part lies in one plane, at least in the region of attachment of the fastener element prior to an after attachment of the fastener element and a) for relatively thin sheet metal parts, the sheet metal part has a smooth, pierced cylindrical opening which has a diameter which corresponds at least substantially to the diameter of the shaft part, with the cylindrical rivet section being reshaped to a rivet bead which contacts the side of the sheet metal part remote from the sheet metal contact shoulder, or b) for sheet metal parts of medium thickness the sheet metal part has a stepped hole with a cylindrical hole part adjacent to the sheet metal contact shoulder and a smaller diameter which corresponds at least substantially to the diameter of the shaft part and with a hole region of a larger diameter which receives the rivet section which has been beaded over to form a rivet bead, or c) for relatively thick sheet metal parts in which the sheet metal part has a thickness which corresponds at least substantially to the total length of the shaft part and the rivet section, or is thicker, the sheet metal part is provided with a conical hole which diverges in the direction from the side of the sheet metal part confronting the sheet metal contact shoulder to the side remote from the sheet metal contact shoulder, with the cylindrical rivet section being reshaped to a conical rivet bead which is wedged in the conically diverging hole.

Thus a fastener element is proposed which admissibly has a basic shape which is known per se but which can also be used with sheet metal parts thicker than 3 mm when the sheet metal part is appropriately prepared.

It is initially important that the sheet metal part lies in one plane in the region of attachment of the fastener element both before and also after the attachment of the fastener element, i.e. the sheet metal part is not provided with a conical projection as in clamping hole riveting, but rather the sheet metal part remains in one plane both during the pre-piercing and also during the attachment of the element.

This admittedly does not preclude the sheet metal being re-shaped before or after the piercing operation to a boss, with the fastener element being attached to the planar base region of the boss, but rather signifies that the sheet metal part lies in one plane both in the immediate vicinity of the attachment of the fastener element and also in radial directions adjacent to the point of attachment.

With relatively thin sheet metal parts, which can for example have a thickness between the 3 mm and 4.5 mm, the rivet section which projects out of the side of the sheet metal part remote from the sheet metal contact shoulder is beaded over to a rivet bead, with the rivet bead then so to say contacting the underside of the sheet metal when the sheet metal contact shoulder of the flange part contacts the top side of the sheet metal. In order to achieve a planar screwed joint then one either has to use a washer with a hole which receives the rivet bead or to operate with a broadened bore in the component to be screwed on to form the joint.

The thread diameter of the fastener element is not restricted to any particular sizes, although in truck construction, with thicker sheet metal parts, bolts are rarely used which have a thread smaller than M8, with thread sizes of M20 and larger not being a rarity.

For somewhat thicker sheet metal parts, for example in the range from between 4.5 mm and 6.5 mm, a stepped hole in the sheet metal part is used in accordance with the invention, with the rivet bead being received in the hole region of larger diameter, i.e. not projecting out of the underside of the sheet metal part. This makes the use of a special washer or the provision of a special recess in the component to be screwed on superfluous.

For thick sheet metal parts, for example having a thickness greater than 6.5 mm, a hole in the sheet metal part is preferably produced by a piercing process, with the hole being made conically divergent in the direction going from the side of the sheet metal part which is adjacent to the sheet metal contact shoulder to the remote side of the sheet metal part. The rivet section is then not shaped into a beaded over rivet bead but rather to a conical shape so that the rivet section is wedged in the conically diverging hole and in this manner prevents the fastener element being pressed out of the sheet metal part.

The fastener element is normally formed as a nut element, i.e. both the flange part and also the shaft part of hollow shape are made hollow with a hollow space having an internal thread. The thread however does not extend into the rivet section because it would otherwise be deformed on beading over of the rivet section. Instead the rivet section normally merges via a ring shoulder and a run-in cone into the hollow shaft part, i.e. into the thread. The provision of such a ring shoulder makes it possible, on the one hand, to keep the rivet section to a suitable dimension in radial thickness and to keep it readily deformable. The shaft part must however be made adequately thick so that the fastener element has a considerable stability and thus suits use in a truck.

This embodiment is particularly favourable because a conically diverging hole of this kind can be made in accordance with the invention relatively easily by a technical pressing operation, and indeed over a considerable range of sheet metal thicknesses, with the conical rivet bead taking place at a point of the hole corresponding to the total length of the shaft part with the rivet section. It is simply necessary to select a die button suitable for the respective sheet metal thickness in order to achieve the dilation of the rivet section to the conical shape.

In the attachment of the fastener element to the respective sheet metal part any noses providing security against rotation that are provided at the fastener element are pressed into the sheet metal part and there form corresponding recesses which, in conjunction with the noses providing security against rotation, generate the required security against rotation.

The noses providing security against rotation extend preferably in the axial direction of the shaft part along the latter and/or they extend in radial directions at the sheet metal contact shoulder.

At this point it should be brought out that it is not essential to design the element such that thinner sheet metal parts lie in the range between 3 to 4.5 mm, that sheet metal parts of medium thickness have range from 4.5 to 6.5 mm and thicker sheet metal parts have a thickness larger than 6.5 mm.

The statement that, with thinner sheet metal parts having a thickness in the range from 3 to 4.5 mm, the rivet bead is located at the underside of the sheet metal part signifies that the shaft part of the element is so designed that it has a length of about 3 mm whereas the rivet section likewise an axial length of about 2.5 mm. Since the total length of the thread is determined by the axial height of the flange part and the axial length of the shaft part, the height of a flange part could be increased and the length of the shaft part could be reduced, whereby the rivet bead at the underside of the sheet metal part will then be possible with even thinner sheet metal parts, with the result that sheet metal parts of medium thickness will then start at lower thicknesses, for example now at 4 mm, because a stepped hole can also be reduced with this sheet metal thickness in which the hole region of larger diameter of larger diameter is also suitable to receive the beaded over rivet section. Thus, as explained above, a planar screwed joint surface results together with the advantages which proceed therefrom. It would however also signify that one could then prepare a conically diverging hole for sheet metal parts for thickness of for example 5.5 mm, so that the stepped hole, which is more complicated to manufacture would not be necessary at all.

From the above explanations it can be seen that one does not have to use all three possibilities in accordance with the invention and that, in particular, with a bore with a conically diverging hole, special advantages result, particularly since a conical shape of this kind can be relatively easily manufactured.

The flange part of the fastener element is of round-circular shape in radial cross-section. The element can thus be advantageously manufactured by cold deformation from round bar material. Through the manufacture from round bar material the flange part can have a rounded shape in side view which on the one hand ensures adequate strength of the flange part to cold deformation and on the other hand an adequate radial extent of the sheet metal contact shoulder, so that the surface contact pressure can be kept small. The avoidance of sharp edges, which do not arise with the rounded shape is of advantage.

One can thus distinguish three different kinds of attachment of the fastener element for the manufacture of the component assembly. With a thinner sheet metal part this is pierced with a hole punch in order to form a smooth pierced cylindrical opening which has a diameter which corresponds at least substantially to the diameter of the shaft part, with the shaft part of the fastener element then being pressed through the cylindrical hole until the sheet metal contact shoulder of the flange part contacts the sheet metal part at one side and the features or noses providing security against rotation have dug into the sheet metal part and the cylindrical rivet section is re-shaped by means of a suitable die button to form a rivet bead which contacts the side of the sheet metal part remote from the sheet metal contact shoulder.

With a sheet metal part of medium thickness the method is carried out in such a way that a stepped hole is produced in the sheet metal part with a cylindrical hole region of smaller diameter adjacent to the sheet metal contact shoulder which corresponds at least substantially to the diameter of the shaft part and with a hole region of larger diameter, with the shaft part of the fastener element being pressed through the hole until the sheet metal contact shoulder of the sheet metal part contacts one side of the sheet metal part and the features and noses providing security against rotation have dug into the sheet metal part, and the cylindrical rivet section is then re-shaped by means of a suitable die button to form a rivet bead, which is received in the hole region of the large diameter.

The stepped hole is for example manufactured by a drilling procedure or by a two-step pressing process.

With a relatively thick sheet metal part the sheet metal part is pierced with a hole punch or otherwise in order to form a conical hole which diverges in the direction from the side of the sheet metal part adjacent to the sheet metal contact shoulder to the side remote from it, with the hole having a diameter at the side adjacent to the sheet metal contact shoulder which corresponds at least substantially to the diameter of the shaft part, with the shaft part of the fastener element being pressed through the hole until the sheet metal contact shoulder of the flange part contacts one side of the sheet metal part and the features or noses providing security against rotation have dug into the sheet metal part and the cylindrical rivet section is then re-shaped by a suitable die button into a conical rivet bead which is wedged in the conically diverging hole.

It is particularly favourable when the conically extending hole adjoins a cylindrical region of the hole which is formed adjacent to the sheet metal contact shoulder. The cylindrical region, which has at least substantially the same diameter as the shaft part, serves on the one hand for a clean guidance of the shaft part of the fastener element and on the other hand that the largest possible security against rotation is produced in this region, because the noses providing security against rotation then produce corresponding grooves in the wall of the hole over their entire radial depth.

The conical piercing preferably takes place using a hole punch with a diameter corresponding to the diameter of the shaft part in combination with a die button of larger diameter. A design of this kind then leads to the hole punch cutting a hole with a smooth wall in the starting region of the hole and subsequently a conical piercing slug from the remaining thickness of the sheet metal part, with the maximum diameter of the piercing slug being determined by the diameter of the hole of the die button. The conicity of the pierced slug is determined by the sheet metal thickness, the diameter of the hole punch and the diameter of the hole of the die button.

Figure 1B:
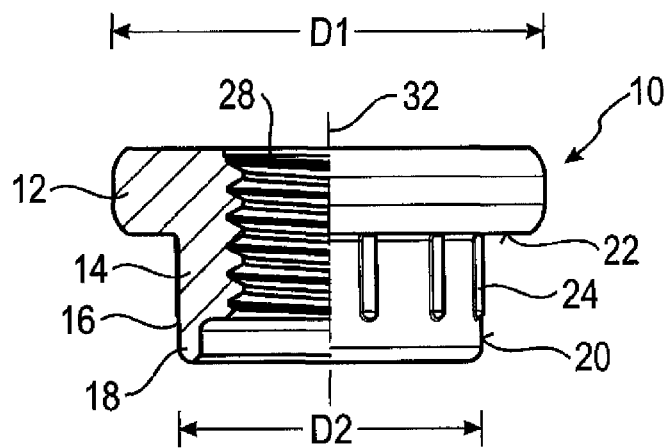
Figure 1C:
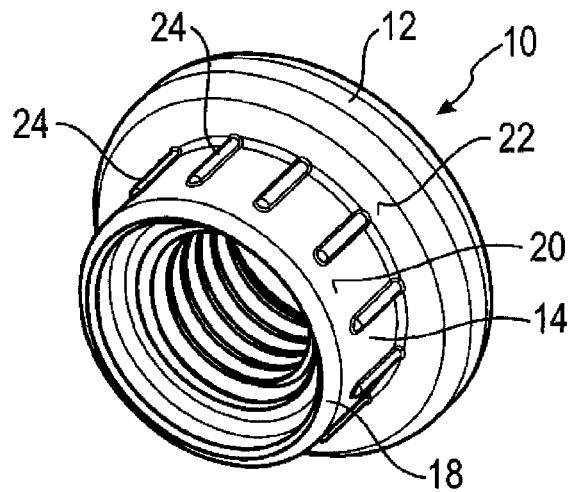
Figure 2A:
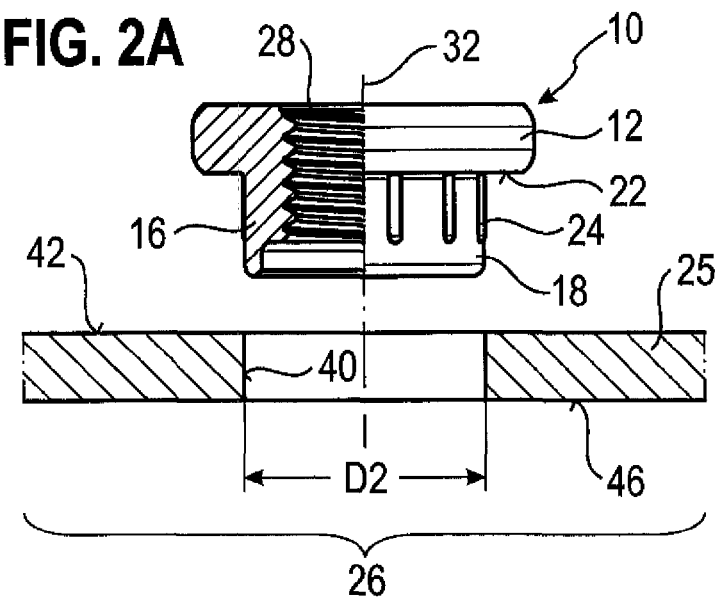
Figure 2B:
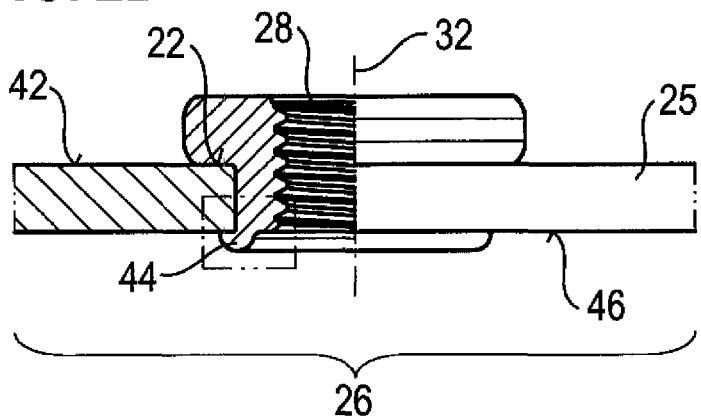
Figure 2C:
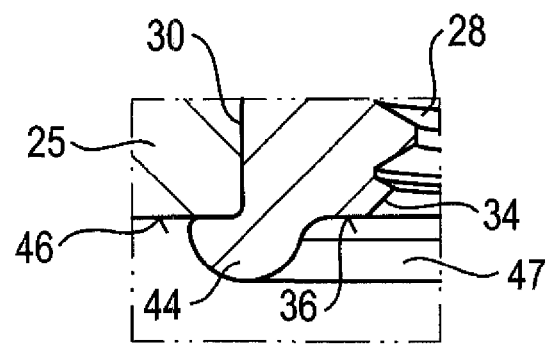
Figure 3A:
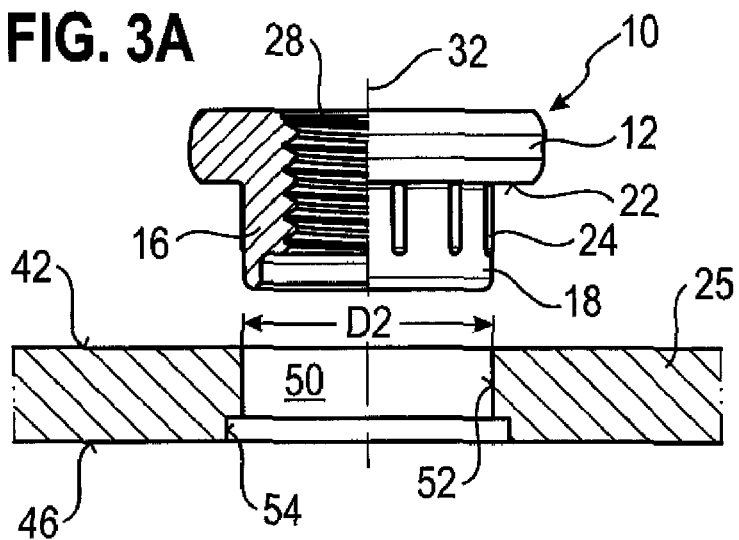
Figure 3B:
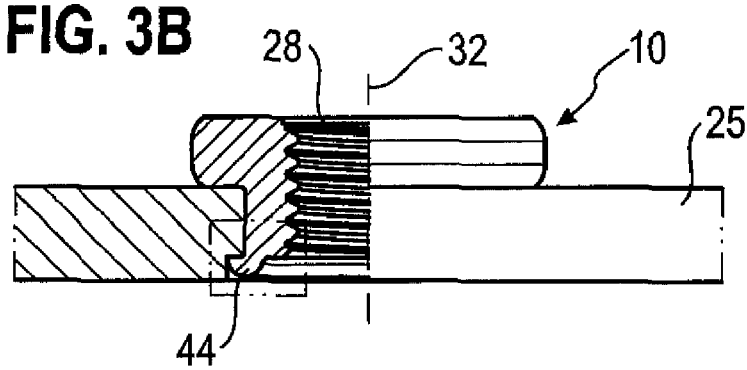
Figure 3C:
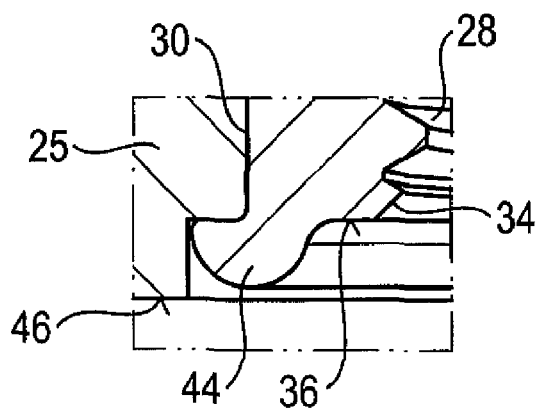

The invention will now be explained in more detail with reference to embodiments and to the drawings in which are shown:

FIGS. 1A to 1C a fastener element which can be combined in accordance with the invention with a sheet metal part to form a component assembly and indeed in a side view onto the rivet section in FIG. 1A, in a partly axially sectioned side view in accordance with FIG. 1B and in a perspective representation in accordance with FIG. 1C, FIGS. 2A to 2C a series of drawings to show the attachment of the fastener element in a thin sheet metal part, FIGS. 3A to 3C a series of sketches to show the attachment of the fastener element in accordance with FIGS. 1A to 1C to a sheet metal part of medium thickness, FIGS. 4A to 4D a series of drawings to show the attachment of the fastener element in accordance with FIGS. 1A to 1C to a sheet metal part of medium thickness or greater thickness, FIGS. 5A to 5D in principle the same situation as in FIG. 3 but including the die button used for this purpose and for the thread sizes M8 (FIG. 5A), M10 (FIG. 5B), M12 (FIG. 5C), M14 (FIG. 5D), FIGS. 6A to 6D in principle the same situation as in FIG. 4 but including the die button used for this purpose and for the thread sizes M8 (FIG. 6A), M10 (FIG. 6B), M12 (FIG. 6C), M14 (FIG. 6D), FIGS. 7A to 7D a series of drawings corresponding to FIGS. 6A to 6D but for the attachment of the fastener element according to FIGS. 1A to 1C to a thicker sheet metal part with the die buttons used for this purpose and for the thread sizes M8 (FIG. 7A), M10 (FIG. 7B), M12 (FIG. 7C), M14 (FIG. 7D).

FIGS. 1A to 1C first show a fastener element 10 which has a flange part 12 of larger diameter D1 and a shaft part 14 of smaller diameter D2 which extends away from the flange part 12 and merges at its end remote from the flange part 12 into a cylindrical rivet section 18 the outer side 20 of which lies at least substantially flush with the outer side of the shaft part 14, i.e. has the same diameter D2. The side of the flange part adjacent to the shaft part 14 forms a sheet metal contact shoulder 22 and features providing security against rotation 24 are provided on the shaft part 14. The features providing security against rotation could also be provided on a sheet metal contact shoulder (not shown) or both on a sheet metal contact shoulder 22 and also on the shaft part 14, for example with a rectangular shape or with a triangular shape in side view.

The fastener element 10 is designed for use with sheet metal parts with thicknesses in the range from 3 mm and larger.

The attachment of a relatively thin sheet metal part will now be described with reference to the FIGS. 2A to 2C. As shown in FIGS. 2A and 2B the sheet metal part 25 lies, at least in the region 26 of attachment of the fastener element, in one plan both before and after attachment of the fastener element.

The fastener element shown here is a nut element with an internal thread 28. The fastener element could optionally also be designed as a bolt element. In this case the shaft part 14 would be extended with a threaded part and a cylindrical rivet section will then be designed in a manner known per se as a skirt, similar for example to that shown in the initially named U.S. Pat. No. 5,251,370 in FIG. 8.

The features 24 providing security against rotation, which are formed by noses providing security against rotation, form corresponding recesses in the sheet metal part on attachment of the fastener element (as shown in FIG. 2C). Here the noses 24 providing security against rotation extend in the axial direction of the shaft along the shaft part. They could, instead of this, or additionally, extend in radial directions at the sheet metal contact shoulder 22 (not shown).

The sheet metal part in the embodiment in accordance with FIGS. 2A to 2C counts as a thinner sheet metal part and has a thickness in the range from 3 to 4.5 mm.

It is furthermore evident from FIGS. 1A to 1C and 2A to 2C that the flange part is circularly round in radial cross-section and in plan view and in that the flange part has a rounded shape in side view.

Furthermore, it is evident that the fastener element 10 has a hollow shaft part 14 and that the central thread 28 extends through the flange part 12 and the shaft part 14 and merges via a conical thread run-in 34 and a radial shoulder 36 into the rivet section 18.

The component assembly in accordance with FIGS. 2B and 2C with a thinner sheet metal part 25 is produced in that the sheet metal part is pierced with a hole punch and a die button in order to form a smooth pierced cylindrical opening 40 which has a diameter D2 which corresponds at least substantially to the diameter of the shaft part 14. For this purpose the sheet metal part 25 is inserted into a press between a die button in the lower tool of the press and a punch in the upper tool of the press or in an intermediate platten of the press, with the die button having an opening with a diameter which is only fractionally larger than the diameter of the punch which corresponds to the diameter D2. During the closing of the press the punch is driven through the sheet metal part and a piercing slug arise which is pressed through the opening of the die button and disposed off. Since the opening of the die button corresponds at least substantially to the outer diameter of the punch and is only fractionally larger than this, a cylindrical hole 40 with smooth walls arises in the sheet metal part.

It should be pointed out that it will also be possible to attach the die button to the intermediate platten of the press and the punch in the upper tool of the press, or to attach the punch to the lower tool of the press and the die button above the punch to the upper tool of the press or to the intermediate platten of the press. The punch could also be attached to the intermediate platten of the press and the die button to the upper tool of the press. Furthermore, the possibility exists of installing the die button and the punch in a so-called C-frame and to effect the piercing of the sheet metal part by corresponding hydraulic loading of the one or other part, i.e. the die button or the punch.

The shaft part 14 of the fastener element 10 is pressed through the cylindrical hole 40 until the sheet metal contact shoulder 22 of the flange part 12 contacts the one side 42 of the sheet metal part and the features or noses 24 providing security against rotation have dug into the sheet metal part. The cylindrical rivet section 18 is re-shaped by means of a suitable die button (not shown) to a rivet bead 44 which contacts the side 46 of the sheet metal part remote from the sheet metal contact shoulder 22.

The attachment of the fastener element of the sheet metal part normally also takes place in a press. For this purpose the fastener element 12 is normally received in a setting head and a rivet die is positioned beneath the sheet metal part and has an end face having a shape complementary to the rivet bead 44 at the underside of the sheet metal part. The die button can for example have a ring groove in the end face which resembles a semi-circle in radial cross-section, as does also the rivet bead 44. I.e. the semi-circular ring groove in the end face of the die button surrounds a projection which in the region 46 fits radially inside the rivet bead 44 and abuts the ring shoulder 36. Outside of the ring groove there is a planar surface which enters into contact with the underside 46 of the sheet metal part 25. By closing of the press the fastener element is so moved from a position above the sheet metal part 25 so that the shaft part 14 of the fastener element moves through the hole 40 until the rivet section 18 engages with the ring groove of the not shown die button and the rivet bead is correspondingly shaped. The press also delivers the force necessary in order to press the noses 24 providing security against rotation through the sidewall of the hole, whereby corresponding grooves extending in the axial direction are formed in the cylindrical sidewall of the hole 40 by the noses providing security against rotation 24.

Here also the die button can be attached to the lower tool of the press and the setting head to the upper tool of the press or to an intermediate platten of the press or, in an inverted arrangement, the setting head can be attached to the lower tool of the press or to the intermediate platten of the press, whereas the die button is mounted on the intermediate platten of the press or on the upper tool of the press respectively. Here the die button or the setting head can also be carried by a corresponding actuating device of a C-shaped frame.

When a press is used the corresponding tools can also be designed as progressive tools with the piercing being effected in a first station and the fastener element being inserted in a second station into the previously generated hole. The progressive tool can however also have further stations so that further working steps can also be carried out at the same time in the press. An arrangement of this kind functions such that the sheet metal part is moved continuously through the press, so that for each stroke of the press working processes can be simultaneously carried out on the sheet metal strip in each working station of the press. After leaving the press or in the press the individual sheet metal parts are then separated from one another i.e. from the sheet metal strip.

The manufacture of a component assembly with a sheet metal part of medium thickness will now be explained with reference to FIGS. 3A to 3C. The fastener element 10 is here the same fastener element as in the previous embodiments. The same reference numerals are used for the same parts and the same features and it will be understood that the previous description applies equally for the parts or features with the same reference numerals unless something different is expressed. In this embodiment a stepped hole 50 is produced in the sheet metal part with a cylindrical hole region 52 of smaller diameter D2, which corresponds at least substantially to the diameter D2 of the shaft part 14, adjacent to the sheet metal contact shoulder and with a hole part 54 of larger diameter. The stepped hole 50 can for example be manufactured by a drilling process or by a two-step pressing process.

The manufacture of a stepped hole of the kind shown by means of a milling tool or a specially ground drill is well known per se. Through manufacture of such a bore in a two-stepped pressing process the sheet metal part 25 is first pierced with a hole punch and a die button as described above, with the sheet metal part being pierced somewhat larger than is required, i.e. with a diameter which is fractionally larger than D2 or, as described below, is conically pierced so that a diverging conical hole arises. The sheet metal part is then processed in a further processing station with a second punch at the one side (the lower side 46 in FIG. 3) in order to generate with the second punch the hole region of larger diameter. During this processing metal flows into the previously generated hole so that the hole diameter in the hole part of smaller diameter is reduced, preferably to a value corresponding to D2.

The shaft part 14 of the fastener element 10 is then pressed through the hole 50 as described for the FIGS. 2A to 2C embodiment until the sheet metal contact shoulder 22 of the flange part 12 contacts the one side 42 of the sheet metal part and the features or noses 24 providing security against rotation have dug into the sheet metal part, as indicated at 30. The cylindrical rivet section 18 is re-shaped to form a rivet bead 44 which is received in the hole region 54 of larger diameter. In this variant the lower side 46 of the sheet metal forms a planar joint surface for a further component, i.e. the rivet bead 44 does not project below the lower side 46 of the sheet metal.

A further variant of the method for the manufacture of the component assembly in accordance with the invention is illustrated graphically in FIGS. 4A to 4D. This method can be used with thicker sheet metal parts or with sheet metal parts of medium thickness, with the use of the method with a sheet metal part of medium thickness being shown here. In this embodiment the sheet metal part is pierced with a hole punch 60 or otherwise in order to form a conical aperture 62 which diverges in the direction from the side 46 of the sheet metal part 25 adjacent to the sheet metal contact shoulder 22 to the side 44 remote from it, with the hole 42 having a diameter D2 at the side 64 adjacent the sheet metal contact shoulder 22 which corresponds at least substantially to the diameter D2 of the shaft part 14.

In order to achieve this conically diverging hole 62 a die button 66 is used here which has a circular opening 68 with a diameter greater than the diameter D2 of the cylindrical hole punch 60. The central passage 69 of the die button below the opening 68 is likewise made conical (or stepped) in order to allow the piercing slug to pass through.

The conicity of the conically diverging region 62 of the hole in the sheet metal part can be selected within the required limits by choice of a diameter D3 of the opening 68 of the die button in comparison with the diameter D1 of the punch. One preferably endeavours to achieve an included cone angel of for example about 7°.

The punch 60 and the die button 66 can, as described in connection with the embodiment of FIGS. 2A to 2C, be used in a press (alternatively to this a C-frame can also be used) as likewise described above.

The thicker the sheet metal part the larger must the diameter D3 of the opening 68 be in order to produce a hole with the desired conical shape.

When using a hole punch with a die button of larger diameter the free end face of the punch first starts to cut a piercing slug out of the sheet metal part. As soon as the cutting forces have exceeded a specific value, the material breaks so that a conical piercing slug is pressed out of the sheet metal part. This type of procedure leads to a situation in which the upper region of the hole, as shown at 64, has the shape of a circular cylinder corresponding to the shape of the punch 60 whereas in the lower region 62 of this embodiment the hole receives the desired conical shape.

The attachment of the fastener element at the sheet metal part also takes place in a press, i.e. in a further station of the same press or in a separate press. The shaft part 14 of the fastener element 10 is pressed through the hole 62 until the sheet metal contact shoulder 22 of the flange part 12 contacts the side 42 of the sheet metal part 25 and the features or noses 24 providing security against rotation have dug into the sheet metal part 25 as indicated at 30. The cylindrical rivet section 18 is re-shaped by means of a corresponding die button to a conical rivet bead 44 which wedges in the conically diverging hole 62.

Since the rivet section is dilated to form a rivet bead 44 this also receives a diverging conical shape at the outer side 70 which is matched to the conical shape of the hole 62. One sees that the rivet bead 44 here also fully contacts above the lower side 46 of the sheet metal part, i.e. the side 46 also forms a planar screw joint side here.

It is particularly advantageous in this embodiment that the same type of fastening can be used with quite different sheet metal part thicknesses without the design of fastener element having to be changed. It is simply necessary to adapt the design of the die button to the respective thickness of the sheet metal part. The die button must also be matched to the respective size of the thread of the fastener element, i.e. to the fastener element itself.

Figure 4A:
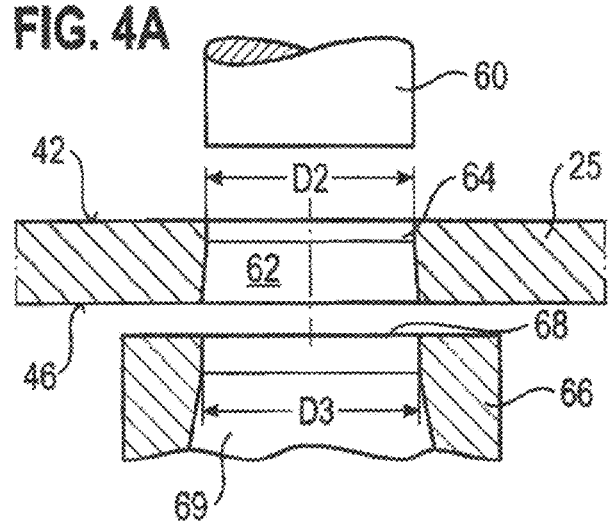
Figure 4B:
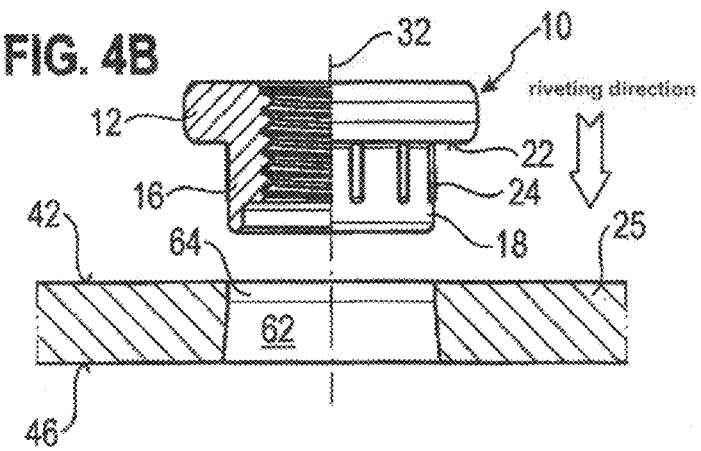
Figure 4C:
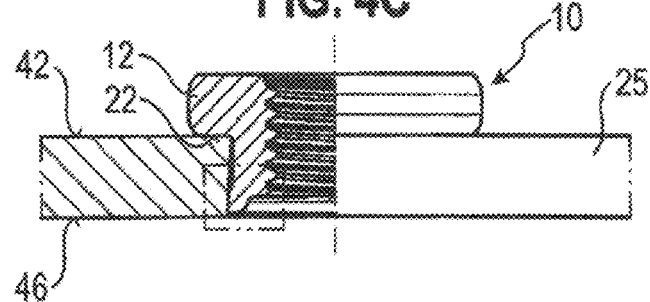
Figure 4D:
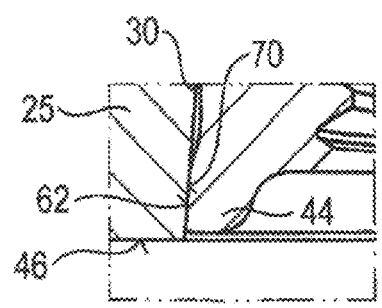

In order to explain this point in more detail the reference is first made to FIGS. 6A to 6D which basically show the same subject matter as FIGS. 4B and 4C but together with the respective used die button 80. One notes that, in accordance with FIG. 4C, the rivet bead 44 finishes just above the lower side 46 of the sheet metal part 25. One also sees from a comparison of the drawings of FIGS. 6A, 6B, 6C and 6D that the die button respectively has a die button projection 80A, 80B, 80C and 80D which is designed for the beading over, i.e. the dilation and deformation of the rivet section 18 of the element, with the die button projection 80A being matched to the thread size M8, die button projection 80B to the thread size M10, the projection 80C for the thread size M12 and the die button 80D to the thread size M14. The invention is however in no way restricted to the thread sized but rather can be used with all other thread size, i.e. also with elements with thread sizes of M20 and above.

The FIG. 7 then shows the same method with a thicker sheet metal part where the dilated rivet bead 44 now finishes significantly above the lower side 46 of the sheet metal, since the sheet metal part 25 is here significantly thicker than the sheet metal part 25 of the FIGS. 6A to 6D.

Here also the die buttons for the thread sizes M8, M10, M12 and M14 are shown. One sees that the die button projection 80A, 80B, 80C and 80D here admittedly has a similar shape to that of the embodiment of FIGS. 6A to 6D but has a larger axial height so that the dilation of the rivet section of the fastener element 10 can be effected in the desired way and means.

Finally the FIGS. 5A to 5D show the die buttons which are used for the thread sizes M8, M10, M12 and M14 in order to form the rivet bead 44 within the hole region 54 of larger diameter with a stepped hole 50, here the fastener elements are so selected that the shaft part 14 is relatively short. If the shaft part is made shorter still then this embodiment can be used with the thinnest sheet metals, i.e. for example of 3 mm or fractionally larger to for example 4.5 mm thickness, so that a situation can be avoided in which the rivet bead projects beyond the lower side 45 of the sheet metal part 25. Here also the die buttons are shown for the thread sizes M8, M10, M12 and M14.

It should be pointed out that the designation "thinner sheet metal parts, sheet metal parts of medium thickness and thick sheet metal parts" are relative designations and that the specific dimensions cannot be prescribed in a fixed form but rather are selected in accordance with the design of the fastener element. In this connection it is important that it is possible for one thread size to cover a wide spectrum of sheet metal thicknesses with one element, for example from 3 mm to 20 mm or more. In this manner it is possible, despite the if anything smaller quantities which are required for, for example trucks, to nevertheless achieve higher quantities of the elements in total so that these can be manufactured at favourable price. The storage of the elements is also simplified in this manner.

It should be brought out that the features providing security against rotation described and/or claimed in this application need not be executed by raised features but rather could also be executed by recesses at the fastener element. In this case the fastener element or the nut element must have a slight oversize relative to the bore. A mixture of raised and recessed features providing security against rotation could also be considered, for example a sequence of alternating noses providing security against rotation and recesses providing security against rotation which are located around the periphery of the shaft part and/or at the sheet metal contact shoulder and preferably—as also the previously described features providing security against rotation—are arranged at regular intervals. The total number of the features providing security against rotation is not critical. From 2 to 18 and preferably 3 to 12 features providing security against rotation can be straightforwardly provided around the longitudinal axis of the fastener element, without restriction.

Furthermore it should be mentioned that the field of use of the component assemblies claimed here is not restricted to the manufacture of trucks but rather includes all areas where sheet metal parts with corresponding thicknesses are used which have to be provided with fastener elements.

In all embodiments all materials can be named as the material for fastener elements which achieve the strength values of class 8 in accordance with the ISO standard or higher in the context of cold deformation, for example a 35B2 alloy in accordance with DIN 1654. The so formed fastener elements are suitable, amongst other things, for all commercial steel materials for deep drawing quality sheet metal parts and also for aluminium or its alloys. Aluminium alloys, in particular those of higher strength can also be used for the fastener elements, for example AlMg5. Fastener elements of higher strength magnesium alloys such as for example AM50 can also be considered.

The invention claimed is:

1. A component assembly comprising a fastener element (10) and a sheet metal part (25), wherein the fastener element (10) has a flange part (12) of a larger diameter (D1) and a shaft part (14) of a smaller diameter (D2) which extends away from the flange part (12), said shaft part having an end (16) remote from the flange part (12) which merges into a cylindrical rivet section (18), said shaft part having an outer side and said cylindrical rivet section having an outer side which is at least substantially flush with said outer side of the shaft part (14), i.e. has the same diameter (D2), wherein said flange part (12) has a side adjacent to the shaft part (14) which forms a sheet metal contact shoulder (22), wherein features providing security against rotation (24) are provided at least one of the shaft part (14) and the sheet metal contact shoulder (22), wherein the fastener element is designed for use with a sheet metal parts (25) having a thicknesses in the range of 3 mm and larger and the sheet metal part having first and second opposed flat surfaces and lies in one plane, at least in the region of attachment of the fastener element prior to and after attachment of the fastener element, said sheet metal contact shoulder lying on said first flat surface, said sheet metal part (25) having a thickness between said first and second opposed flat surfaces which corresponds at least substantially to the total length of the shaft part (14) and the rivet section (18) or being thicker, and wherein the sheet metal part (25) is provided with a conically diverging hole (62) which diverges in the direction from the side of the sheet metal part confronting the sheet metal contact shoulder (22) to the side (42) remote from the sheet metal contact shoulder (22), with the cylindrical rivet section (18) being reshaped to a conically diverging rivet bead (44) which is wedged in the conically diverging hole (62), said conically diverging hole (62) being of greater length than said conically diverging rivet bead.

2. A component assembly in accordance with claim 1, wherein the fastener element (10) is a nut element.

3. A component assembly in accordance with claim 1, wherein the features (24) providing security against rotation are formed by noses providing security against rotation which engage in corresponding recesses (30) formed in the sheet metal part, on attachment of the fastener element thereto.

4. A component assembly in accordance with claim 3, wherein the noses (24) providing security against rotation extend in at least one of the following directions: in the axial direction (32) of the shaft part (14) along the latter and in radial directions at the sheet metal contact shoulder (22).

5. A component assembly in accordance with claim 1, wherein said sheet metal part (25) has a thickness greater than 6.5 mm.

6. A component assembly in accordance with claim 1, wherein the flange part (12) is circular in radial cross-section.

7. A component assembly in accordance claim 1, wherein the flange part (12) has a rounded form in side view.

8. A component assembly in accordance with claim 1, wherein the fastener element (10) has a hollow shaft part (14) with a central thread (28) which extends through the flange part (12) and the shaft part (14).

9. A component assembly comprising a fastener element (10) and a sheet metal part (25), wherein the fastener element (10) has a flange part (12) of a larger diameter (D1) and a shaft part (14) of a smaller diameter (D2) which extends away from the flange part (12), said shaft part having an end (16) remote from the flange part (12) which merges into a cylindrical rivet section (18), said shaft part having an outer side and said cylindrical rivet section having an outer side which is at least substantially flush with said outer side of the shaft part (14), i.e. has the same diameter (D2), wherein said flange part (12) has a side adjacent to the shaft part (14) which forms a sheet metal contact shoulder (22), wherein features providing security against rotation (24) are provided at least one of the shaft part (14) and the sheet metal contact shoulder (22), wherein the fastener element is designed for use with a sheet metal part (25) having a thickness in the range of 3 mm and larger and the sheet metal part having first and second opposed flat surfaces and lies in one plane, at least in the region of attachment of the fastener element prior to and after attachment of the fastener element, said sheet metal contact shoulder lying on said first flat surface, wherein said sheet metal part (25) having a thickness between said first and second opposed flat surfaces which corresponds at least substantially to the total length of the shaft part (14), the sheet metal part (25) having a smooth, pierced cylindrical opening (40) which has a diameter (D2) which corresponds at least substantially to the diameter (D2) of the shaft part (14), with the cylindrical rivet section (18) being reshaped to a rivet bead (44) which contacts the side of the sheet metal part remote form the sheet metal contact shoulder.

10. A component assembly comprising a fastener element (10) and a sheet metal part (25), wherein the fastener element (10) has a flange part (12) of a larger diameter (D1) and a shaft part (14) of a smaller diameter (D2) which extends away from the flange part (12), said shaft part having an end (16) remote from the flange part (12) which merges into a cylindrical rivet section (18), said shaft part having an outer side and said cylindrical rivet section having an outer side which is at least substantially flush with said outer side of the shaft part (14), i.e. has the same diameter (D2), wherein said flange part (12) has a side adjacent to the shaft part (14) which forms a sheet metal contact shoulder (22), wherein features providing security against rotation (24) are provided at least one of the shaft part (14) and the sheet metal contact shoulder (22), wherein the fastener element is designed for use with a sheet metal part (25) having a thickness in the range of 3 mm and larger and the sheet metal part has having first and second opposed flat surfaces and lies in one plane, at least in the region of attachment of the fastener element prior to and after attachment of the fastener element, said sheet metal contact shoulder lying on said first flat surface and sheet metal part (25) having a stepped hole (50) with a cylindrical hole part (52) adjacent to the sheet metal contact shoulder (22) of a smaller diameter (D2) which corresponds at least substantially to the diameter (D2) of the shaft part (14) and corresponds in length substantially to the length of said shaft part, and a hole region (52) of a larger diameter which receives the rivet section (18) which has been beaded over to form a rivet bead (14).

* * * * *